(12) United States Patent
Tiirola et al.

(10) Patent No.: US 11,895,586 B2
(45) Date of Patent: Feb. 6, 2024

(54) TEMPORARILY FLOATING DL TIMING APPROACH FOR UNLICENSED RADIO BAND SCENARIOS

(71) Applicant: Nokia Technologies Oy, Espoo (FI)

(72) Inventors: Esa Tiirola, Kempele (FI); Kari Hooli, Oulu (FI); Tao Tao, Shanghai (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 19 days.

(21) Appl. No.: 16/967,969

(22) PCT Filed: Feb. 16, 2018

(86) PCT No.: PCT/CN2018/076923
§ 371 (c)(1),
(2) Date: Aug. 6, 2020

(87) PCT Pub. No.: WO2019/157766
PCT Pub. Date: Aug. 22, 2019

(65) Prior Publication Data
US 2020/0396686 A1 Dec. 17, 2020

(51) Int. Cl.
*H04W 52/02* (2009.01)
*H04W 72/1273* (2023.01)
*H04W 72/23* (2023.01)

(52) U.S. Cl.
CPC ... *H04W 52/0229* (2013.01); *H04W 72/1273* (2013.01); *H04W 72/23* (2023.01)

(58) Field of Classification Search
CPC ......... H04W 52/0229; H04W 72/1273; H04W 72/1289
See application file for complete search history.

(56) References Cited

U.S. PATENT DOCUMENTS

2009/0180427 A1 7/2009 Kuo
2016/0254901 A1 9/2016 You et al.
(Continued)

FOREIGN PATENT DOCUMENTS

CN 1314747 A 9/2001
CN 101238688 A 8/2008
(Continued)

OTHER PUBLICATIONS

Office action received for corresponding Korean Patent Application No. 2020-7020706, dated Aug. 18, 2021, 3 pages of office action and 2 pages of translation available.
(Continued)

*Primary Examiner* — Christopher M Crutchfield
*Assistant Examiner* — Tito Q Pham
(74) *Attorney, Agent, or Firm* — SQUIRE PATTON BOGGS (US) LLP

(57) ABSTRACT

Methods include performing, by a terminal device, downlink control channel monitoring according to a first time pattern. The methods include determining that data has been transmitted on downlink on a number of symbols and based on the determination that the data is transmitted, suspending the performing of downlink control channel monitoring according to the first time pattern. The methods also include performing downlink control channel monitoring on at least one symbol after transmission of the data.

7 Claims, 9 Drawing Sheets

(56) References Cited

U.S. PATENT DOCUMENTS

| | | | |
|---|---|---|---|
| 2016/0278118 A1* | 9/2016 | Yerramalli | H04L 5/0053 |
| 2017/0202054 A1* | 7/2017 | Rathonyi | H04L 69/28 |
| 2017/0207895 A1 | 7/2017 | Yang et al. | |
| 2017/0290008 A1 | 10/2017 | Tooher et al. | |
| 2018/0097673 A1* | 4/2018 | Nangia | H04L 5/0064 |
| 2018/0279350 A1* | 9/2018 | Jiang | H04W 28/04 |
| 2018/0302810 A1* | 10/2018 | Fujishiro | H04W 76/28 |
| 2019/0069258 A1* | 2/2019 | Jeon | H04W 48/20 |
| 2019/0081821 A1* | 3/2019 | Bendlin | H04L 25/03904 |
| 2019/0373623 A1* | 12/2019 | Li | H04L 5/0044 |
| 2020/0022160 A1* | 1/2020 | Zou | H04W 72/1242 |
| 2020/0187204 A1* | 6/2020 | Alriksson | H04W 72/0446 |
| 2020/0235886 A1* | 7/2020 | Salim | H04L 5/0094 |
| 2020/0260418 A1* | 8/2020 | Xue | H04W 72/0446 |
| 2020/0351923 A1* | 11/2020 | Karaki | H04W 74/0808 |
| 2020/0404617 A1* | 12/2020 | Murray | H04W 68/00 |
| 2021/0120574 A1* | 4/2021 | Takeda | H04W 72/042 |

FOREIGN PATENT DOCUMENTS

| | | |
|---|---|---|
| CN | 101483885 A | 7/2009 |
| EP | 3 297 339 A1 | 3/2018 |
| WO | 2014/025211 A1 | 2/2014 |
| WO | 2016/186016 A1 | 11/2016 |
| WO | 2017/056396 A1 | 4/2017 |
| WO | 2017/099526 A1 | 6/2017 |
| WO | 2017/122135 A1 | 7/2017 |
| WO | 2019157766 A1 | 8/2019 |

OTHER PUBLICATIONS

Office action received for corresponding Japanese Patent Application No. 2020-543578, dated Sep. 7, 2021, 2 pages of office action and 3 pages of translation available.

"Remaining details on DL control channel design", 3GPP TSG-RAN WG1 #91, R1-1720023, Agenda Item: 6.2.1.2.2, Intel Corporation, Nov. 27-Dec. 1, 2017, pp. 1-7.

"Discussion on data scheduling", 3GPP TSG RAN WG1 Meeting AH 1801, R1-1800767, Agenda Item: 7.3.3.1, ASUSTeK, Jan. 22-26, 2018, 3 pages.

"Corrections to 38.214 resource allocation", 3GPP TSG RAN WG1 Meeting AH 1801, R1-1800939, Agenda Item: 7.3.3.1, Nokia, Jan. 22-26, 2018, 6 pages.

"Summary of 7.3.3.1 (resource allocation)", TSG-RAN WG1 AdHoc 1801, R1-1801011, Agenda Item: 7.3.3.1, Ericsson, Jan. 22-26, 2018, 14 pages.

Office action received for corresponding Indian Patent Application No. 202047028026, dated Jun. 25, 2021, 7 pages.

Extended European Search Report received for corresponding European Patent Application No. 18892806.3, dated Jul. 9, 2021, 9 pages.

"On the mini-slot design in NR", 3GPP TSG-RAN WG1#NR, R1-1701052, Agenda item: 5.1.4, Nokia, Jan. 16-20, 2017, 9 pages.

"Control Channel Design with Mini-slot", 3GPP TSG RAN WG1 AH_NR Meeting, R1-1701140, Agenda Item: 5.1.4, Convida Wireless, Jan. 16-20, 2017, 3 pages.

Partial European Search Report received for corresponding European Patent Application No. 18906696.2, dated Aug. 25, 2021, 13 pages.

"New SID on NR-based Access to Unlicensed Spectrum", 3GPP TSG RAN Meeting #75, RP-170828, Agenda: 9.1, Qualcomm, Mar. 6-9, 2017, 5 pages.

"3rd Generation Partnership Project; Technical Specification Group Radio Access Network; Evolved Universal Terrestrial Radio Access (E-UTRA); Physical layer procedures (Release 15)", 3GPP TS 36.213, V15.0.0, Dec. 2017, pp. 1-493.

International Search Report and Written Opinion received for corresponding Patent Cooperation Treaty Application No. PCT/CN2018/076923, dated Nov. 8, 2018, 9 pages.

International Search Report and Written Opinion received for corresponding Patent Cooperation Treaty Application No. PCT/FI2018/050932, dated Mar. 21, 2019, 14 pages.

"PDCCH Monitoring for Slots and Mini-slots", 3GPP TSG RAN WG1 Meeting #89, R1-1707162, Agenda : 7.1.3.1.2, ZTE, May 15-19, 2017, 4 pages.

"On DL Control Channel Monitoring", 3GPP TSG RAN WG1 #89, R1-1707381, Agenda : 7.1.3.1.2, Intel Corporation, May 15-19, 2017, pp. 1-5.

"5G", Wikipedia, Retrieved on Aug. 5, 2020, Webpage available at : https://en.wikipedia.org/w/index.php?title=5G&oldid=815822122.

Singapore Office Action corresponding to SG Application No. 11202006089Q, dated Apr. 25, 2022.

Chinese Office Action corresponding to CN Application No. 201880089036.8, dated Aug. 3, 2022.

Extended European Search Report received for corresponding European Patent Application No. 18906696.2, dated Nov. 26, 2021, 13 pages.

European Communication pursuant to Article 94(3) EPC, corresponding to Ep Application No. 18 906 696.2, dated May 11, 2023.

Singapore Written Opinion corresponding to SG Application No. 11202006089Q, dated Jun. 16, 2023.

* cited by examiner

| CORESET LENGTH (#SYMBOLS) | NON-INTERLEAVED MAPPING (REG BUNDLE: FREQUENCY X TIME) | INTERLEAVED MAPPING (REG BUNDLE: FREQUENCY X TIME) |
|---|---|---|
| 1 | 6(6x1) | 2(2x1), 6(6x1) |
| 2 | 6(3x2) | 2(1x2), 6(3x2) |
| 3 | 6(2x3) | 3(1x3), 6(2x3) |

FIG.3

| i | K₀ | S | L | 740 |
|---|----|---|----|-----|
| 0 | 0  | 2 | 12 |     |
| 1 | 0  | 3 | 11 |     |
| 2 | 0  | 2 | 10 |     |
| 3 | 0  | 3 | 9  |     |
| 4 | 0  | 2 | 9  |     |
| 5 | 0  | 3 | 8  |     |
| 6 | 0  | 2 | 8  |     |
| 7 | 0  | 3 | 7  |     |

FIG.7

TEMPORARILY FLOATING DL TIMING APPROACH FOR UNLICENSED RADIO BAND SCENARIOS

RELATED APPLICATION

This application was originally filed as PCT Application No. PCT/CN2018/076923 on Feb. 16, 2018, each of which is incorporated herein by reference in its entirety.

TECHNICAL FIELD

The teachings in accordance with the exemplary embodiments of this invention relate generally to Radio Standards including physical layer (PHY), Medium access control (MAC), Radio Link Control (RLC), Radio Resource Control (RRC), etc., and particularly, to downlink control channel transmission and reception.

BACKGROUND

Downlink control channel may be monitored in unlicensed radio band (for example, NR unlicensed band) scenarios to provide (for example, NR-based) access to unlicensed spectrum. NR physical downlink control channel (PDCCH) may be used to convey downlink control information (DCI). NR PDCCH may utilize Orthogonal Frequency Division Multiplexing (OFDM) waveform and polar coding. NR PDCCH may utilize every fourth resource element for demodulation reference signal (DMRS). DCI may be used for downlink (DL) and uplink (UL) resource allocation signalling. DCI may also be used for other purposes, such as carrier aggregation and bandwidth part (BWP) (de)activation, frame structure indication (Group common PDCCH) and power control updates.

PDCCH blind search may be arranged by means of parallel search spaces sets mapped to one or multiple control resource sets (CORESET). CORESET properties may include frequency time resources, DMRS properties, REG bundle sizes, mapping, etc. A search space set may cover multiple search spaces with different aggregation levels. Search space set properties may include a number of BDs per each aggregation level, DCI sizes to be monitored, RNTIs to be monitored, periodicity of the first pattern, etc. During the PDCCH blind search, a user equipment (UE) may monitor predefined control channel elements (CCEs), aggregated CCEs and Downlink Control Information (DCI) sizes in predefined time instants or monitoring occasions.

Certain abbreviations that may be found in the description and/or in the Figures are herewith defined as follows:
AL aggregation level
BD Blind decoding
BPL Beam Pair Link
BWP Bandwidth part
CA Carrier aggregation
CC Component carrier
CCE Control channel element
CE Control Element
CORESET Control resource set
COT Channel occupancy time
CSS Common search space
DAI Downlink Assignment Index
DCI Downlink Control Information
DL Downlink
DMRS Demodulation Reference Signal
DRX Discontinued reception
DwPTS Downlink Pilot Time Slot
eMBB enhanced mobile broad band
gNB 5G Enhanced Node B (Base station)
HARQ Hybrid Automatic Repeat Request
LAA Licensed assisted access
LTE long term evolution
MAC Medium access control
MEC multi-access edge computing
MME mobility management entity
NACK Negative acknowledgement
NCE network control element
NR New radio
NR-PDCCH New radio Physical Downlink Control Channel
N/W Network
OFDM Orthogonal Frequency Division Multiplexing
PBCH Physical Broadcast Channel
PDCCH Physical Downlink Control Channel
PDSCH Physical Downlink Shared Channel
PUCCH Physical Uplink Control Channel
PUSCH Physical Uplink Shared Channel
RE Resource Element
REG Resource element group
RF Radio Frequency
RNTI Radio Network Temporary Identifier
RRC Radio Resource Control
RS Reference Signal
RSRP Reference Signal Received Power
SS Search space
SSS Search space set
TRP Transmission—reception point
TXRU Transceiver Unit
UE User Equipment
UL Uplink
USS User-specific search-space
5G Fifth generation mobile communication system

SUMMARY

This section contains examples of possible implementations and is not meant to be limiting:

In accordance with one aspect, an example method comprises performing, by a terminal device, downlink control channel monitoring according to a first time pattern; determining that data is transmitted on downlink on a number of symbols; based on the determination that the data is transmitted, suspending the performing of downlink control channel monitoring according to the first time pattern; and performing downlink control channel monitoring on at least one symbol after transmission of the data.

In accordance with another aspect, an example apparatus comprises at least one processor; and at least one non-transitory memory including computer program code, the at least one memory and the computer program code may be configured to, with the at least one processor, cause the apparatus to: perform downlink control channel monitoring according to a first time pattern; determine that data is transmitted on downlink on a number of symbols; based on the determination that the data is transmitted, suspend the performing of downlink control channel monitoring according to the first time pattern; and perform downlink control channel monitoring on at least one symbol after transmission of the data.

In accordance with another aspect, an example apparatus comprises by the apparatus, downlink control channel monitoring according to a first time pattern; means for determining that data is transmitted on downlink on a number of symbols; means for based on the determination that the data is transmitted, suspending the performing of downlink control channel monitoring according to the first time pattern; and means for performing downlink control channel monitoring on at least one symbol after transmission of the data.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 3 shows an example table of supported PDCCH mapping options;

FIG. 7 shows an example illustration of values for a default downlink table;

DETAILED DESCRIPTION

In the example embodiments as described herein a method and apparatus that provides downlink channel control procedures for single beam and multi-beam scenarios.

Figure 1:
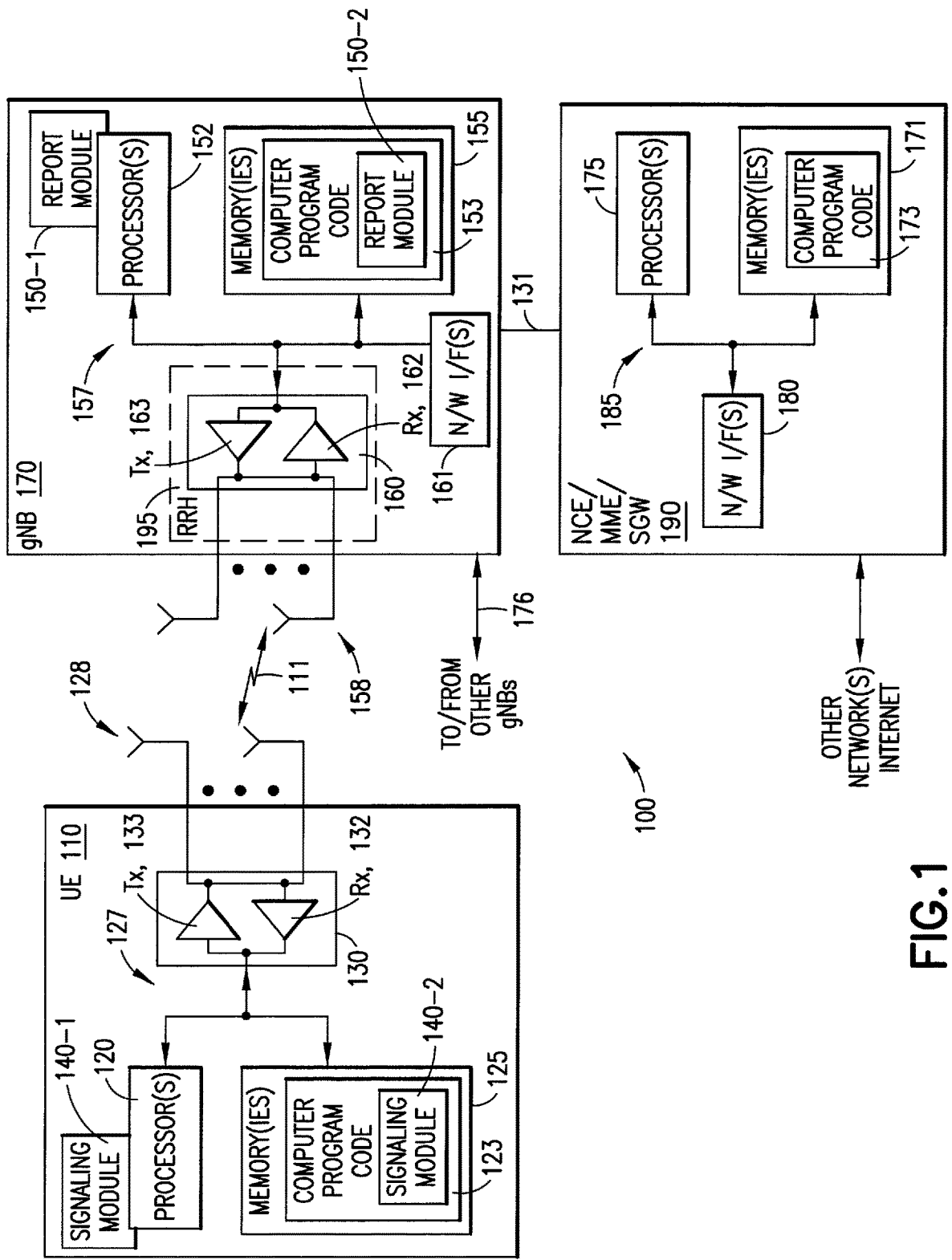
FIG. 1 is a block diagram of one possible and non-limiting example system in which the example embodiments may be practiced.

Turning to FIG. 1, this figure shows a block diagram of one possible and non-limiting example system in which the example embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a signaling module 140, comprising one of or both parts 140-1 and/or 140-2, which may be implemented in a number of ways. The signaling module 140 may be implemented in hardware as signaling module 140-1, such as being implemented as part of the one or more processors 120. The signaling module 140-1 may be implemented also as an integrated circuit or through other hardware such as a programmable gate array. In another example, the signaling module 140 may be implemented as signaling module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with eNB 170 via a wireless link 111.

The gNB (NR/5G Node B but possibly an evolved NodeB) 170 is a base station (e.g., for LTE, long term evolution, or for NR, New Radio) that provides access by wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The gNB 170 includes a report module 150, comprising one of or both parts 150-1 and/or 150-2, which may be implemented in a number of ways. The report module 150 may be implemented in hardware as report module 150-1, such as being implemented as part of the one or more processors 152. The report module 150-1 may be implemented also as an integrated circuit or through other hardware such as a programmable gate array. In another example, the report module 150 may be implemented as report module 150-2, which is implemented as computer program code 153 and is executed by the one or more processors 152. For instance, the one or more memories 155 and the computer program code 153 are configured to, with the one or more processors 152, cause the gNB 170 to perform one or more of the operations as described herein. The one or more network interfaces 161 communicate over a network such as via the links 176 and 131. Two or more gNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

It is noted that description herein indicates that "cells" perform functions, but it should be clear that the gNB that forms the cell will perform the functions. The cell makes up part of a gNB. That is, there can be multiple cells per gNB. Each cell may contain one or multiple transmission and receiving points (TRPs).

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The gNB 170 is coupled via a link 131 to the NCE 190. The link 131 may be implemented as, e.g., an Si interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, gNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Embodiments herein may be implemented in software (executed by one or more processors), hardware (e.g., an application specific integrated circuit), or a combination of software and hardware. In an example of an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium or other device that may be any media or means that can contain or store the instructions for use by or in connection with an instruction execution system, apparatus, or device, such as a computer.

The current architecture in LTE networks is fully distributed in the radio and fully centralized in the core network. The low latency requires bringing the content close to the radio which leads to local break out and multi-access edge computing (MEC). 5G may use edge cloud and local cloud architecture. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services and augmented reality. In radio communications, using edge cloud may mean node operations to be carried out, at least partly, in a server, host or node operationally coupled to a remote radio head or base station comprising radio parts. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

Example embodiments may be implemented in network backhaul. Example embodiments may also be implemented in relay nodes (for example, with regard to functions described herein below with respect to UE 110). Furthermore, in a multi-hop relay scenario, a relay node (RN) may implement functionality described with respect to gNB 170 hereinbelow.

Having thus introduced one suitable but non-limiting technical context for the practice of the example embodiments of this invention, the example embodiments will now be described with greater specificity.

Figure 2:
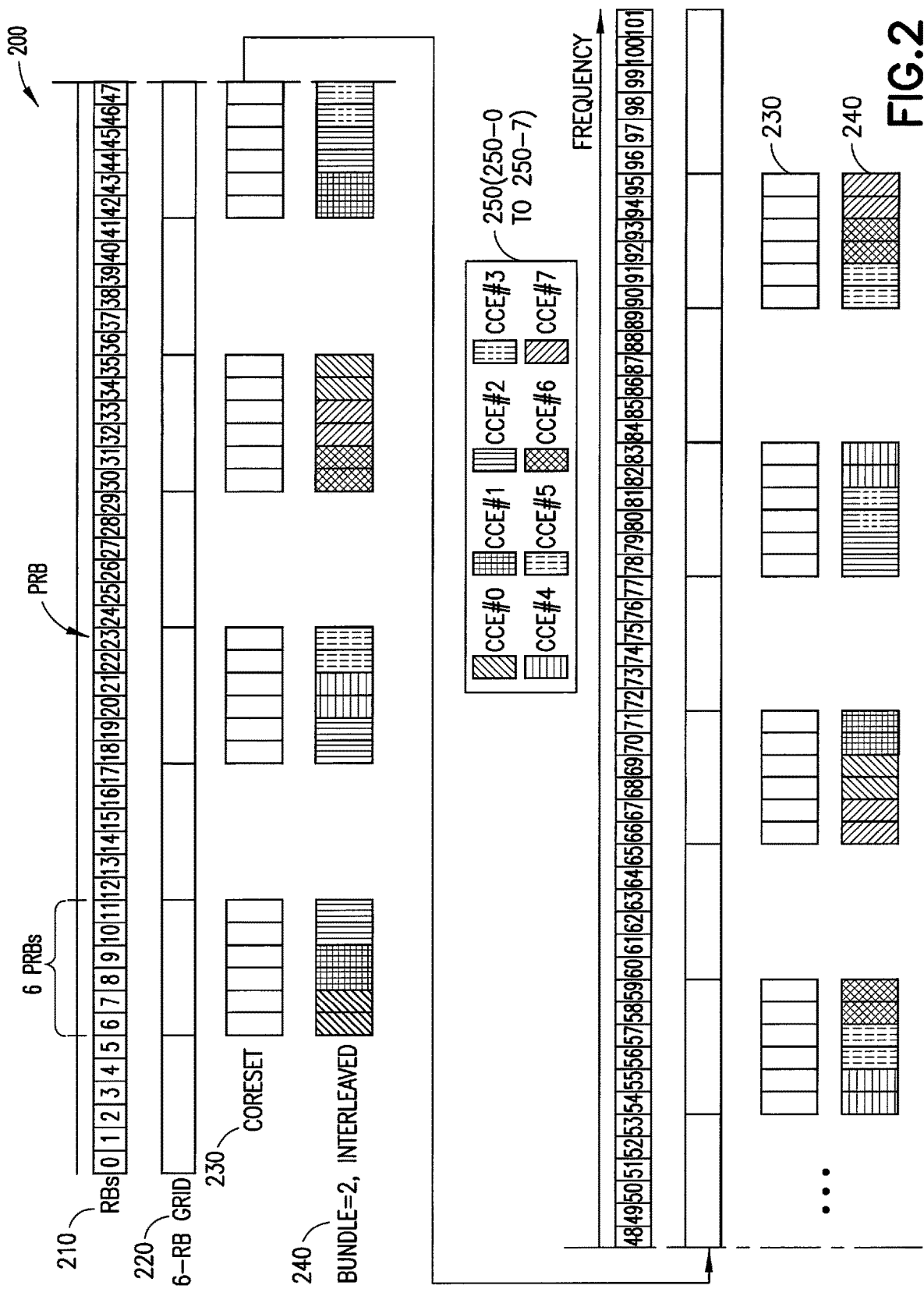
FIG. 2 shows an example illustration of interleaved REG-to-CCE mapping, REG bundle size=2.

FIG. 2 illustrates an interleaved REG-to-CCE mapping 200, in which REG bundle size=2. REG-to-CCE mapping 200 includes physical resource blocks (RBs or PRBs) 210, a 6 RB grid 220, CORESETs 230, interleaved REG Bundles 240 and a CCE key 250 (corresponding to CCEs 250-0 to 250-7).

In particular instances, example embodiments described herein may be directed to the monitoring of the control channel in NR that may be carried out by means of blind searches. Blind search or blind decoding may refer to the process by which a UE 110 finds its PDCCH by monitoring a set of PDCCH candidates in every monitoring occasion. A monitoring occasion may be once a slot, once per multiple slots or multiple times in a slot. In an example embodiment, PDCCH blind search may be arranged by means of parallel search space sets mapped to one or multiple control resource sets (CORESETs). During a PDCCH blind search, a UE 110 may be monitoring predefined control channel elements (CCEs), aggregated CCEs and/or downlink control information (DCI) sizes with predefined RNTIs (Radio Network Temporal Index) in predefined time instants, corresponding to configured monitoring occasions.

CCEs may be arranged within a predefined CORESET configured via higher layer signalling. Each CCE may include 6 REGs, each REG consisting of 12 subcarriers within 1 OFDM symbol, and 1, 2 or 3 REG bundles. REG bundles may be arranged into the CORESET either according to interleaved or non-interleaved mapping. The UE 110 may be configured to assume that REG bundle defines the precoder granularity in frequency and time used by gNB 170 when transmitting PDCCH. According to another example embodiment, the UE 110 may be configured such that precoder granularity in frequency is equal to the number of contiguous RBs in the frequency domain. CORESET resources may be configured in units of 6 resource blocks in the frequency.

As shown in FIG. 2, PDCCH blind search may be arranged by means of parallel search space sets mapped to one or multiple control resource sets (CORESET) 230. During the PDCCH blind search, UE 110 may monitor predefined control channel elements (CCEs), aggregated CCEs and DCI sizes in predefined time instants.

There is a linkage between a search space set and a CORESET. In Rel-15, the max number of CORESETs configurable for a bandwidth part (BWP) in a cell for a UE is 3 and the max number of search space sets configurable for a BWP in a cell for a UE is 10, respectively.

Multiple PDCCHs may be transmitted in a single CORESET which may and may not be all relevant to a particular UE 110. The UE 110 may find the PDCCH specific to it by monitoring a set of PDCCH candidates (a set of consecutive CCEs 250 on which a PDCCH could be mapped) in every monitoring occasion. The set of CCEs may be determined by a hashing function. Monitoring occasions may be configured separately for each search space set.

CCEs 250 may be arranged within a predefined CORESET configured via higher layer signalling. As shown, CCEs 250 may include CCEs 250-0 to 250-7 (for example, CCE 250-0, CCE 250-1, CCE 250-2, etc.). Each CCE 250 consists of 6 REGs (for example, 12 subcarrier, 1 OFDM symbol), and 1, 2 or 3 REG bundles. REG bundles may be mapped into the CORESET either using interleaved or non-interleaved mapping. The UE 110 may assume that REG bundle defines the precoder granularity in frequency and time used by gNB 170 when transmitting PDCCH. FIG. 2 shows an example PDCCH mapping assuming 1 symbol CORESET, interleaved REG-to-CCE mapping and REG bundle size 2. The REG bundle sizes options supported by NR are listed in Table 300, shown in FIG. 3.

As shown in table 300, supported matching options may include CORESET length 310 (for example, a number (#) of symbols), and for each CORESET length, a corresponding non-interleaved mapping (REG bundle: frequency×time) 320 and interleaved mapping (REG bundle: frequency× time) 330. For example, as shown in FIG. 3, a CORESET length 310 of 1 has a corresponding non-interleaved mapping of 6(6×1) and interleaved mapping of 2(2×1), 6(6×).

Table 3 lists the REG bundle sizes options in terms of REGs, supported by new radio (NR).

Referring back to FIG. 2, the system may be implemented based on working assumptions and agreements made in the RAN1 working group (WG) meetings. In the case when only CORESET(s) for slot-based scheduling is configured for UE 110, the maximum number of PDCCH blind decodes per slot per carrier may be the variable X. The value of X may not exceed 44. The parameter X may vary according to scenario (for example, according to the subcarrier spacing and/or according to UE 110 capability). In a particular CORESET, two types of search spaces (for example, UE-common search space and UE-specific search space) may have different periodicities for a UE 110 to monitor. Periodicity in this instance refers to a slot (or corresponding time) after a recurring number of slots (which may correspond to a particular time) that the UE 110 performs a monitoring operation. A small periodicity may correspond to a large frequency. According to an example embodiment, monitoring periodicity for each search space may be one of the following values: {1, 2, 4, 5, 8, 10, 16, 20} slots.

A set of search spaces may be determined by one set of the following parameters: 1) A set of aggregation levels. 2) The number of PDCCH candidates for each aggregation level. 3) PDCCH monitoring occasion for the set of search spaces.

At least for cases other than initial access, to identify a set of search spaces, the following parameters may be configured by UE-specific RRC signaling. 1) The number of PDCCH candidates for each aggregation level of {1, 2, 4, 8, 16}. One value may be selected from {0, 1, 2, 3, 4, 5, 6, 8}. 2) PDCCH monitoring occasion for the set of search spaces. One value may be selected from {1-slot, 2-slot, 4-slot, 5-slot, 8-slot, 10-slot, 16-slot, 20-slot. 3) One or more value(s) may be selected from a plurality of symbols within a monitored slot, for example, $1^{st}$ symbol, $2^{nd}$ symbol, . . . , $14^{th}$ symbol within a monitored slot. This may be done also by means of bitmap signalling. Each set of search spaces may associate with a CORESET configuration by RRC signaling.

System 100 may be implemented in a radio system, such as an NR system, which may support both slot based and non-slot (for example, in other words, mini-slot) based scheduling. A slot may be defined as a number of OFDM symbols, such as 14 OFDM symbols with normal CP. A slot may contain all downlink, all uplink, or at least one downlink part and at least one uplink part. Mini-slots are a subslot structure defined in 5G. Mini-slots consist of one or more symbols (for example, up to 13 symbols). In DL mini slot, the first symbol(s) may include(s) downlink control information. Mini-slots may be used for operation in unlicensed bands, such as to begin transmission directly after a successful listen-before-talk procedure without waiting for the slot boundary.

Figure 4:
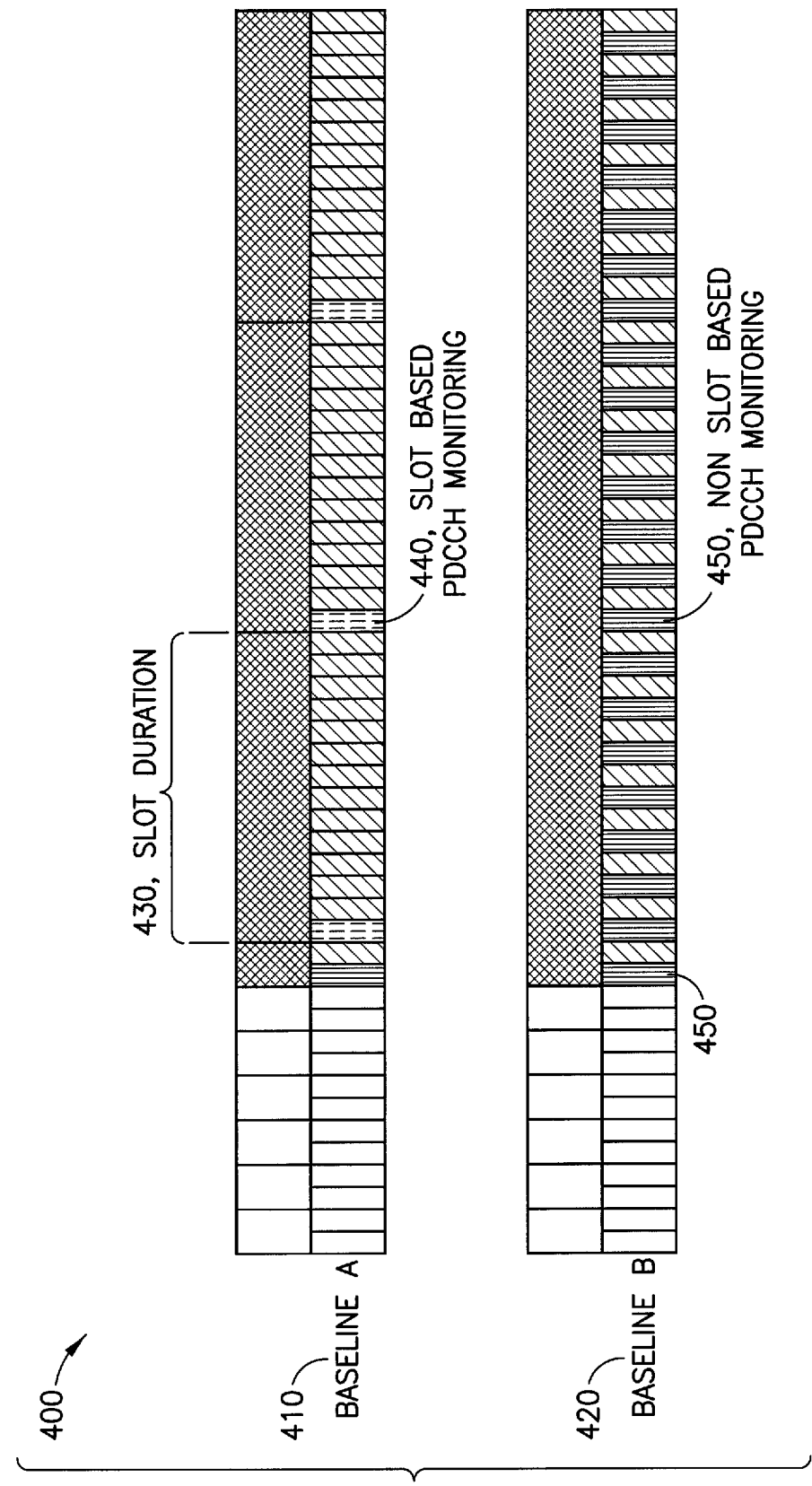
FIG. 4 shows an example illustration of baseline solutions for managing PDCCH blind Searches.

Referring to FIG. 4 an example an example illustration of a baseline solution 400 for Managing PDCCH blind Searches in New Radio Unlicensed band scenario is shown. The baseline solution 400 may comply with specifications provided in 3GPP NR Release 15.

When NR is applied on unlicensed band requiring contention based channel access procedure, it is beneficial that gNB 170 or UE 110 may swiftly occupy a channel once the channel access procedure indicates the channel to be vacant. If gNB 170 or UE 110 waits for too long in self-deferral to align transmissions with slot boundary, more agile systems may occupy the channel in the meanwhile. Mini-slot presents an efficient way to reduce the time between the consecutive possible transmission starting positions. The example embodiments provide a (for example, configurable, reasonable, etc.) trade-off between the control channel decoding burden and frequency of transmission starting positions and allay some drawbacks of mini-slot, such as increased control channel blind decoding burden on the UE 110 side or higher demodulation reference signal overhead that arise from more frequent transmission starting positions. Furthermore, the number of BDs per slot may be limited. The same limitations may apply to the number of CCEs for which the UE 110 may perform channel estimation per slot. Hence, usage of mini-slot based PBDDH monitoring may reduce the number of BD candidates and/or CCE for channel estimation, available per search space/CORESET.

As described above with respect to FIG. 2, and the agreements made in the RAN1 working group (WG) meetings (RAN1 #90), the UE 110 in NR systems may be configured to monitor a search space set associated to a DL control resource set (CORESET) with a particular periodicity. The UE 110 may be configured to monitor multiple such search space sets (associated to the same or different CORESETs), possibly configured with different periodicities, such as slot level periodicity (14 symbols) and mini-slot periodicity (2 symbols).

Referring back to FIG. 4, there is shown two baseline approaches (baseline A 410 and baseline B 420) for PDCCH monitoring in an unlicensed band scenario. The baseline solutions are based on NR phase 1.

Baseline A 410 illustrates an instance in which UE 110 may switch from mini-slot to slot-based monitoring at the boundary of the first full slot. As shown, baseline A 410 slot based PDCCH monitoring 440 used for depicts a slot duration 430. In some instances, issues may arise because the gNB 170 hardware may need to prepare two PDCCH and PDSCH versions (mini-slot and full slot) as the gNB 170 may need (for example, be required, instructed) to start the preparations before the channel access is obtained thereby leading to added gNB 170 complexity.

Baseline B 420 illustrates an instance in which UE 110 monitors PDCCH constantly according to mini-slot periodicity 450. As shown, baseline B depicts non-slot based PDCCH monitoring 450. In some instances, issues may arise because of excessive PDCCH monitoring overhead for UE 110 or if the number of BDs is limited, the gNB's 170 opportunities for sending PDCCH for certain UE 110 or a certain set of UEs 110 may be reduced considerably. This may be due to increase in the PDCCH blocking probability in the multi-user scenarios where gNB 170 needs to send PDCCH for multiple UEs 110 during the same slot. These instances may include also excessive PDCCH overhead (for example, for either or both of UE(s) 110 and gNB(s) 170).

Figure 5:
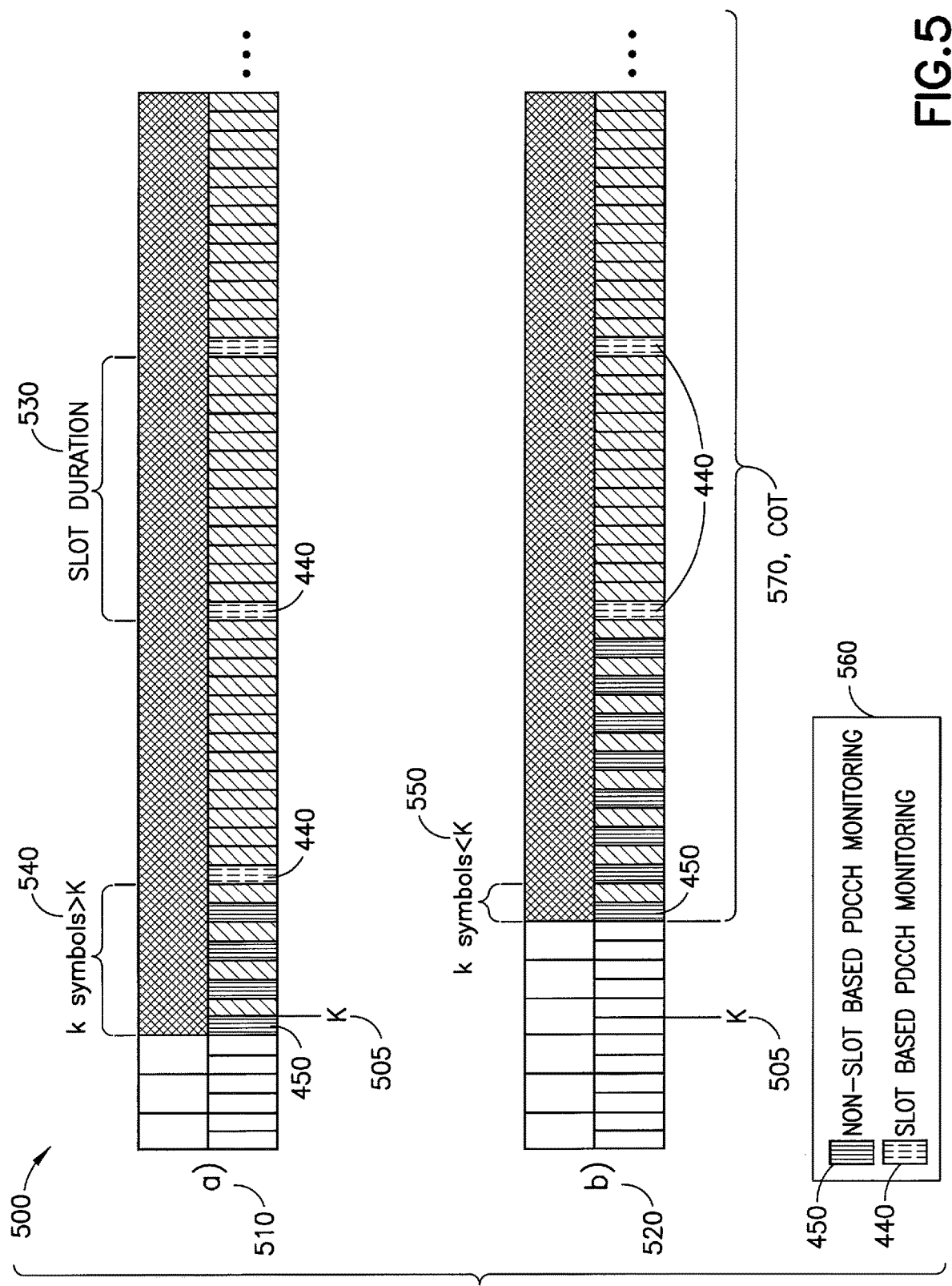
FIG. 5 shows an example illustration of defining PDCCH monitoring according to non-slot based approach.

FIG. 5 shows an example illustration of COT (channel occupancy time) based PDCCH monitoring 500 of an unlicensed band. As shown in key 560, the slots may be monitored based on non-slot based PDCCH monitoring 570 or by slot based PDCCH monitoring 580.

FIG. 5 illustrates PDCCH monitoring in an unlicensed band scenario. In the example embodiment of COT based PDCCH monitoring, PDCCH monitoring during slot n may be based on mini-slot resolution. UE 110 may determine that a COT has started in slot n, and k OFDM symbols before the next slot boundary (k may have been determined also with respect to slot starting symbol). Determination that a COT has started may be based on detection of a reference signal, downlink control information, or detection of some other DL signal. k is a starting symbol for a COT before the next slot boundary. Parameter n (not shown in FIG. 5) corresponds to the slot index where the COT starts. K can be seen as a threshold value for PDCCH transmission (from gNB 170 point of view) and PDCCH monitoring (from UE 110 point of view) controlling when to switch from mini-slot based operation to slot based operation. K may be determined, for example, in terms of OFDM symbols before the next slot boundary (K could have been determined also with respect to slot starting symbol). Parameter K may be configured by higher layer signalling.

Once detecting the start position of the COT, the UE 110 may determine the symbol timing with respect to the slot structure, for example, based on the synchronisation signal block (SSB), including primary synchronization signal (PSS), secondary synchronization signal (SSS) and physical broadcast channel (PBCH). In the present context, start of COT means start of downlink transmission or start of downlink transmission burst. COT means the transmission duration, that is, the time that the transmission occupies the channel. Single COT may contain single transmission or both downlink and uplink transmission.

As shown in instance part a) 510 in FIG. 5, if k≥K (for example, shown in part a) of FIG. 5, 510 ask symbols>K, 540), PDCCH monitoring in slot n+1 and the following slots within the COT 570 may be based on slot resolution 440. Otherwise, PDCCH monitoring in slot n+1 may be based on mini-slot resolution 450 (for example, shown in part b) of FIG. 5, 520 as k symbols<K, 550). PDCCH monitoring in slot n+2 and the following slots within the COT may be based on slot resolution 440.

However, with regard to the approach presented in FIG. 5, depending on the (value of) k, the UE 110 may be required (or directed, need) to operate according to non-slot based operation more than what is necessary from the channel occupancy and gNB's 170 DL transmission preparation point of view (for example, the UE 110 may be required to operate according to non-slot based operation more than a minimum number of times with respect to channel occupancy and gNB's 170 DL transmission). This may increase the power consumption of the UE 110 due to PDCCH blind decoding, and may create additional HARQ-ACK feedback in UL, as well as increase the control/RS overhead.

In LTE LAA, common signalling indicates the type of (for example, normal or partial ending) subframe of a current and the next subframe. In LTE LAA, common signaling to indicate the type (normal or DwPTS-like) of the current and the next subframe is transmitted in every DL subframe. However, the LTE LAA approach may require added complexity of processes at the eNB 170. For example, the eNB 170 hardware may need to prepare two PDCCH and PDSCH versions. This common signalling may increase the overhead. Furthermore, common signalling defined for LTE LAA may not be applicable in some instances with regard to NR scenario based on mixture of slots and mini-slots, such as described above with respect to FIG. 5.

Figure 6:
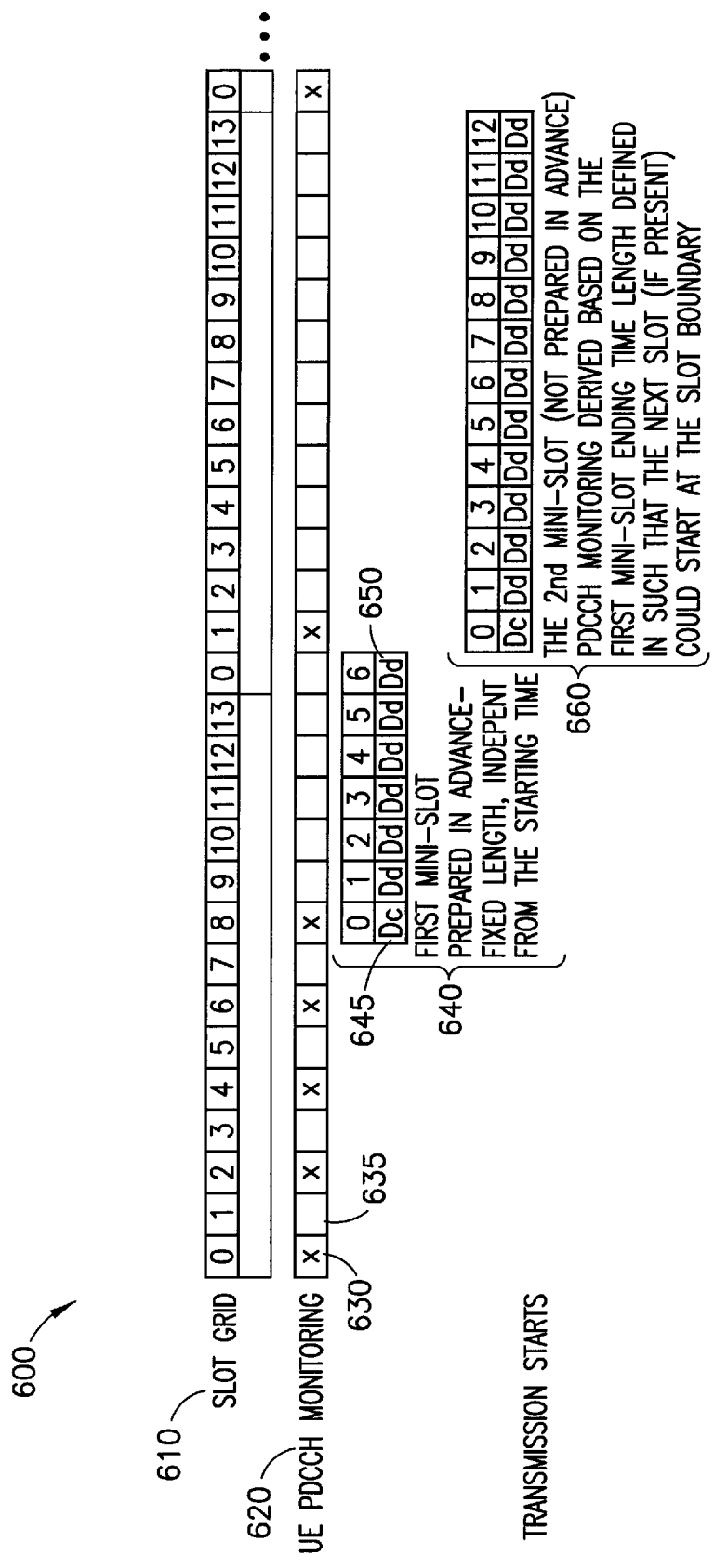
FIG. 6 shows an example illustration of a temporarily floating DL timing approach for an unlicensed radio scenario.

FIG. 6 shows an example illustration of a temporarily floating DL timing diagram 600 for an unlicensed radio scenario (for example, an NR unlicensed radio scenario). Example embodiments may facilitate temporarily floating DL timing for radio (for example, NR) unlicensed band operation. For example, gNB 170 may prepare PDSCH (and, in some instances, PDCCH) before knowing the exact timing (within slot) when the channel becomes free (and when gNB is allowed to start to transmit). This approach may allow for efficient implementation of NR unlicensed band operation. Efficient implementation (of DL transmission signal preparation for NR unlicensed band operation) may be allowed (for example, caused, facilitated, etc.) in these instances because the gNB 170 does not need to prepare multiple PDSCH length options for varying starting time candidates. gNB 170 may start transmitting DL transmission (Tx) burst at an earliest instance (for example, as soon as possible), right after a positive listen before talk (LBT) operation. Listen-before-talk (clear channel assessment) may be required when operating in unlicensed spectrum. LBT may be based on energy detection. Positive LBT may indicate that a node can transmit. For example, detected energy may have been below a predefined threshold for a predefined period of time, which results to positive LBT indicating that a node can transmit. The prepared PDSCH (and PDCCH) may be slot-based or mini-slot-based. The PDSCH length may be conveyed in the DCI scheduling the PDSCH.

After the first PDSCH (plus PDCCH), gNB 170 may use mini-slot(s) or PDSCH with adjusted length to align transmission with slot grid.

Before receiving the first PDCCH (and PDSCH) of the DL Tx burst, the UE 110 performing PDCCH monitoring may follow non-slot based operation. The UE 110 may perform this process with the periodicity of p OFDM symbols ($p \in [1, 2, 3, 4, 5, 7, 13]$ OFDM symbols, or according to the predefined monitoring pattern within the slot.

In an instance in which the UE 110 finds a first PDSCH, the UE 110 may suspend the configured PDCCH monitoring and set the next PDCCH monitoring occasion according to the PDSCH duration indicated in the DL assignment.

UE 110 may repeat this process (of suspending the configured PDCCH monitoring and set the next PDCCH monitoring occasion) for more than one PDSCH, until the scheduled PDSCH ends with the slot boundary. After the scheduled PDSCH ends with the slot boundary, UE 110 may monitor PDCCH based on the slot boundary (and according to slot-based monitoring).

As shown in FIG. 6, the UE 110 may perform PDCCH monitoring 620 of a symbol grid 615 in relation to a slot grid 610. The UE 110 may perform this process based on an assumption that the PDCCH monitoring 630 takes place with periodicity of two OFDM symbols (shown as PDCCH monitoring 630 and symbol 635, during which there is no PDCCH monitoring indicated).

The length of the first PDSCH (plus PDCCH) 640 is 7 OFDM symbols in this example. The length of the first PDSCH is variable and may be 14 in another example. This first mini-slot or slot 645 may be prepared in advance and may have a fixed length. PDCCH symbol Dc 645 and PDSCH symbol Dd 650 illustrate instances in which PDCCH and PDSCH is used within a mini-slot.

The length of the second PDSCH (plus PDCCH) 660 may be, for example, (longer than the length of the first PDSCH and PDCCH) 13 OFDM symbols. The second mini-slot 645 may have not been prepared in advance. The PDCCH monitoring in this instance is derived based on the first mini-slot ending time. The length may be defined in such a way that the next slot (if present) may be able to start at the slot boundary.

PDSCH length may be determined from the DCI scheduling PDSCH. gNB 170 may configure a table, such as described with respect to FIGS. 7 and 8 below, by means of RRC signaling.

The example embodiments provided herein may provide a flexible length of the first transmission of the DL Tx burst, possibly crossing slot boundary. The first transmission may be prepared in advance (without knowing the absolute time when the channel is available). The example embodiments may allow usage of mini-slot(s) or shortened PDSCH(s) to align the slot grid until the next slot boundary. The example embodiments may provide floating PDCCH monitoring after the first transmission until the next slot boundary or PDSCH ending at the slot boundary. Floating PDCCH monitoring may be determined by using the first transmission duration to offset the configured PDCCH monitoring set.

Figure 7:
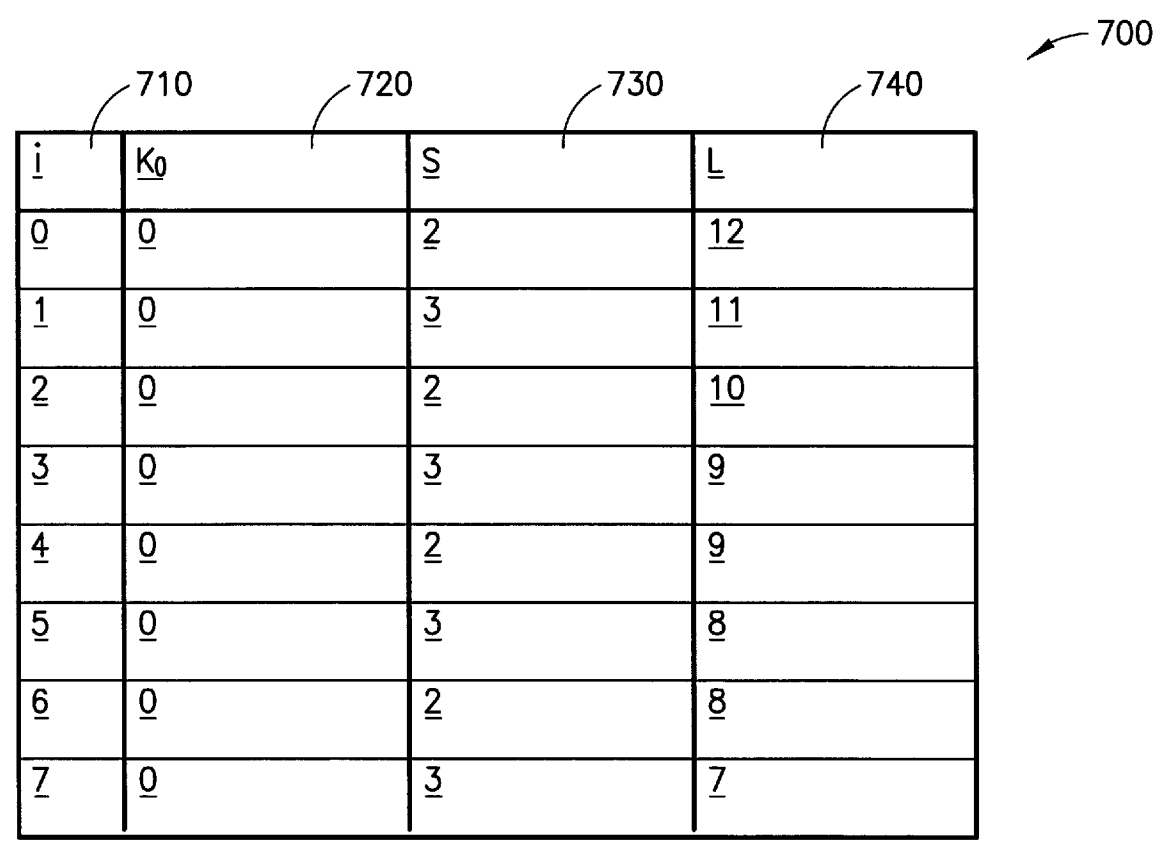

FIG. 7 shows an example illustration of values for a default downlink table 700.

Default table 700 for DL may include columns $K_0$ 720, S 730 and L 740 and index i 710, where $K_0$ is the PDSCH slot relative to the PDCCH where the PDSCH is scheduled, S is the starting symbol and L the number of symbols to be used for PDSCH transmission in the downlink, and index i is provided in the PDCCH downlink control information as the time-domain resource allocation index (for example, 0 to 7).

PDSCH length may be determined from the DCI scheduling PDSCH. gNB 170 may configure a table, such as table 700, by means of RRC signaling. The table 700 may contain all possible PDSCH allocations (including both scheduling delay $K_0$ 720 and PDSCH symbols within slot).

gNB 170 may select a row entry of the table for each scheduled PDSCH. A default table, such as table 700, may be applied for UEs 110 which do not have RRC connection established (at a time of selection).

Figure 8:
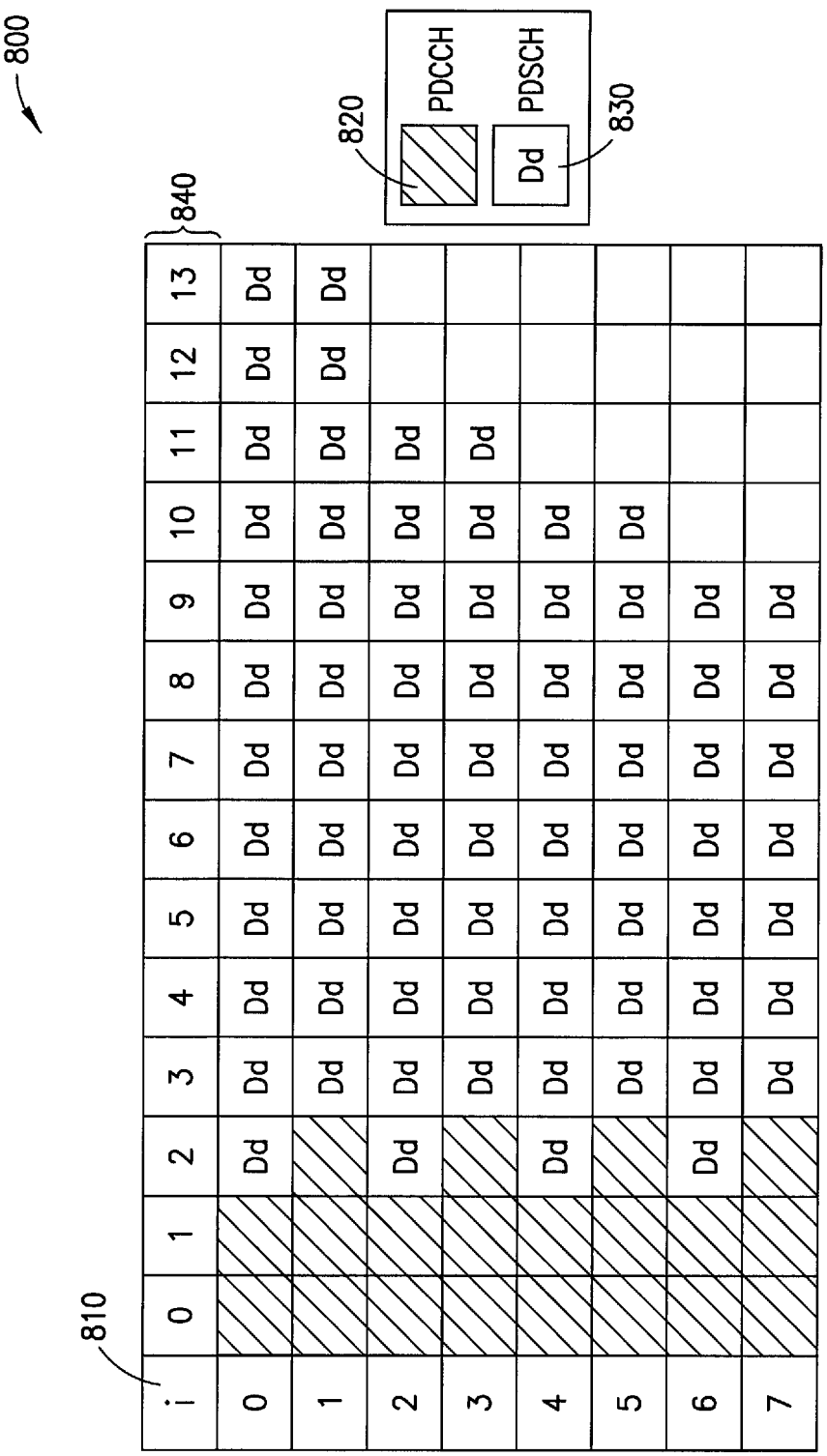
FIG. 8 shows an example illustration of a slot symbol allocation table.

It should be noted that FIGS. 7 and 8 cover only limited options available for PDSCH (slot/mini-slot) time domain resource allocation. The related parameters are CORESET size (i.e. number of OFDM symbols reserved for PDCCH), which defines the PDSCH starting symbol S, and the number of OFDM symbols allocated to PDSCH, defined by parameter L. The tables may be extended to support all needed options including examples shown in FIG. 6 (640: $K_0=0$, S=1, L=6, 660: $K_0=0$, S=1, L=12).

FIG. 8 shows an example illustration of a slot symbol allocation table 800. Table 800 includes an index i 810 (which may correspond to index i 710, described above with respect to FIG. 7), with symbol spaces 840 ranging from 0 to 13.

The S 730 and L 740 values of the table 700, described with respect to FIG. 7 hereinabove, correspond to the slot symbol allocation table 800, in which the first 2 or 3 symbols of a slot are left free of PDSCH (for example, these slots may be allocated for PDCCH 820) with PDSCH allocation starting at the third or fourth symbol. Dd 830 correspond to the L symbols allocated for PDSCH (including the DMRS). In the instance in which $K_0=0$ the same-slot PDCCH schedules the PDSCH. In instances in which i>1, the process includes room for a guard period and short PUCCH at the end of the slot. For example, for i=2, symbol spaces 12 and 13 are available for guard period and short PUCCH.

According to example embodiments, DCI may indicate just (for example, only) the slot, and symbols of the slot where PDSCH is transmitted. PDCCH may be configured separately by means of higher layer signaling. PBCH may be used to configure CORESET/monitoring occasions for common search space used to schedule remaining minimum system information (RMSI) (CS S-TYPE0). UE-specific higher layer signaling may define CORESET/monitoring occasions for different UE-specific search space sets.

Figure 9:
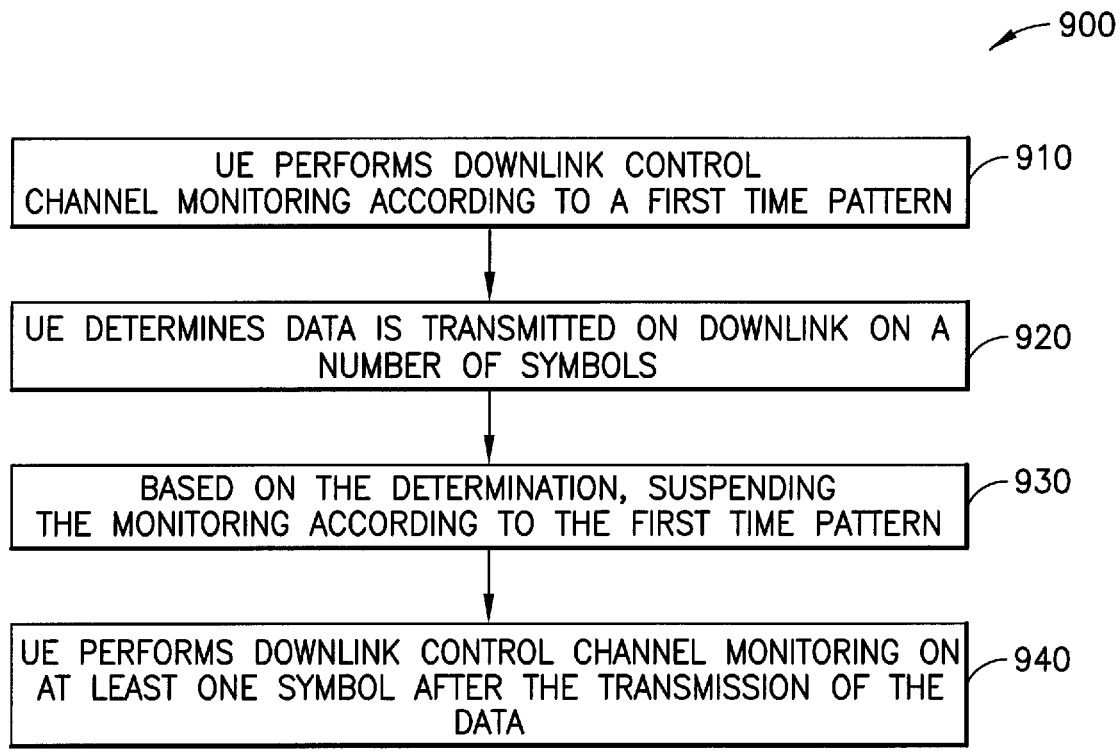
FIG. 9 shows a method in accordance with example embodiments which may be performed by an apparatus.

FIG. 9 is an example flow diagram 900 of a method in accordance with example embodiments which may be performed by an apparatus, for example, a UE 110 as described herein.

At block 910, UE 110 may perform downlink control channel monitoring on unlicensed band according to a first time pattern. The first pattern may correspond to non-slot based monitoring. For example, UE 110 may perform PDCCCH monitoring during the OFDM symbols 0-8, as described with respect to FIG. 6 herein above. UE 110 may have received configuration parameters for the downlink control channel monitoring according to the first and a second time pattern.

At block 920, UE 110 may determine that data is transmitted on downlink on a number of symbols. In an example embodiment, this may correspond to transmission of mini-slot 0-6. For example, with respect to FIG. 6, this may correspond to OFDM symbols #8-#0. In instances in which UE 110 detects DL assignment, UE 110 may offset the configured PDCCH monitoring occasion set according to the PDSCH duration indicated in the DL assignment so that next PDCCH monitoring occasion starts on the next symbol after the end of PDSCH.

At block 930, based on the determination that data is transmitted on downlink (for example, with respect to FIG. 6, UE 110 may determine at symbol 8 that a data is transmitted (data is represented by mini-slot 640)) on a number of symbols, UE 110 may suspend the monitoring according to the first time pattern. For example, UE 110 may stop monitoring via (frequent) first pattern monitoring (symbols 10, 12, 0). According to an example embodiment, data may be transmitted on PDSCH.

According to an example embodiment, the determination that the data is transmitted may be based on at least one of detecting a DL assignment intended for the UE 110 on the downlink control channel, and detecting downlink control information intended for a group of UEs 110.

At block 940, UE 110 may perform downlink control channel monitoring on at least one symbol after the transmission of the data. UE 110 may stop offsetting and return back to the configured PDCCH monitoring occasion set at the next slot boundary after the end of PDSCH. UE 110 may perform downlink control channel monitoring according to a second time pattern at least for one next slot after the end of the transmission of the data. According to an example embodiment, the UE 110 may start monitoring the second mini-slot (right after the first mini-slot). Further to this example embodiment, monitoring of the second mini-slot may not be slot based. If the first transmission (slot or mini-slot) happens to end at the slot boundary, the second transmission (slot) and the corresponding PDCCH monitoring may be done according to slot-based operation (the second time pattern). The second mini-slot (660) and the corresponding PDCCH monitoring may not be needed if the first mini-slot (640) happens to end at the slot boundary. When the first mini-slot is found, in some instances, UE 110 may perform less frequent monitoring.

According to an example, UE 110 may perform the downlink control channel monitoring on the at least one symbol after the transmission of the data based on at least one of the configuration parameters of the downlink control channel monitoring associated to the first time pattern or the second time pattern. The first pattern may be non-slot based monitoring before the first mini-slot (640) is received. This (these) may be seen as (a) separate monitoring occasion(s) (derived from the end of the first mini-slot) between the first pattern and the second pattern (slot based monitoring).

The offsetting of PDCCH monitoring occasion set may be further limited with additional conditions. For example, UE 110 may not have detected DL signal in PDCCH monitoring occasion(s) for slot based scheduling or in a slot prior the DL assignment and/or DL assignment may have an explicit flag for offsetting PDCCH monitoring occasions and/or DL assignment may not be within a previously indicated or detected COT/Tx burst.

UE 110 may stop offsetting and return back to the configured PDCCH monitoring occasion set (the second pattern) at the next slot boundary after the end of PDSCH.

According to an example embodiment, the first time pattern may have more than one downlink control channel monitoring occasion per slot and the second time pattern may follow slot periodicity. UE 110 may follow the configured PDCCH monitoring occasions according to a non-slot based operation (in other words, the UE 110 may monitor PDCCH for at least one search space at least two times per slot).

According to an example embodiment, the UE 110 may determine that the downlink transmission (for example, burst) has ended and, based on the determination, suspend the downlink control channel monitoring according to the second time pattern. The UE 110 may determine that DL TX burst has ended (as well as perform PDCCH monitoring according to the second pattern) from group-common PDCCH.

According to an example embodiment, the UE 110 may determine that there is no downlink transmission from the base station and, based on the determination, perform the downlink control channel monitoring according to the first time pattern.

UE 110 may determine that downlink transmission has ended or that there is no downlink transmission based on detecting absence of a reference signal, physical downlink control channel or some other DL signal.

UE 110 may perform error case handling for instances in which the UE 110 misses a second (or, for example, subsequent) DL assignment. In some instances, UE 110 may not have received the first PDCCH correctly (for example, the UE 110 may not have received indication corresponding to the location of the second PDCCH). In some instances, UE 110 may not have been scheduled with the first PDCCH (for example, UE 110 may not have received indication corresponding to the location of the second PDCCH). In these instances, the effects of the error may be limited as, in instances in which UE 110 determines (for example, receives information) that DL Tx burst has started, UE 110 may start monitoring PDCCH according to slot based operation from the beginning of the next slot. Additionally, it is possible to use group-common PDCCH to indicate the length of the first PDCCH such that all UEs 110 may derive the location of the second PDCCH from that information. In one example embodiment, PDCCH monitoring opportunity may be provided at the beginning of each slot. This may further minimize the consequences of the PDCCH misdetection.

Figure 10:
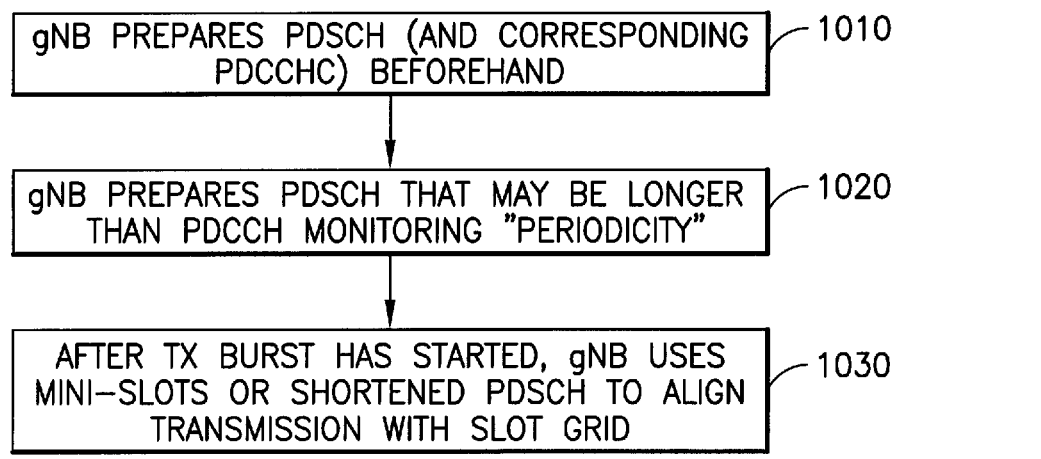
FIG. 10 shows another method in accordance with example embodiments which may be performed by an apparatus.

FIG. 10 is an example flow diagram 800 illustrating a method in accordance with example embodiments which may be performed by an apparatus, for example, a gNB 170 as described herein.

At block 1010, gNB 170 may prepare PDSCH (plus corresponding PDCCH) beforehand. The gNB 170 may not know the actual starting time of the transmission (symbol within the slot and slot index). The actual transmission may be triggered by positive LBT, and the transmission may be aligned with the UE 110 PDCCH monitoring occasions.

At block 1020, gNB 170 may determine the prepared PDSCH to be longer than PDCCH monitoring periodicity. In these instances, transmission may have lowered (for example, reasonable) control and DMRS overhead (for example, substantially below that of 2-symbol mini-slot). The dense starting positions may require a high rate of PDCCH blind decoding at UE 110 (which may be unavoidable in the instances in which fast access is preferred).

At block 1030, after the Tx burst has started, gNB 170 may use mini-slots or shortened PDSCH to align Tx with slot grid. gNB 170 data transmission may continue at the time when the UE 110 performs determining that data has been transmitted on downlink on a number of symbols.

According to an example, a method may include transmitting, by a base station (for example, gNB 170), a first downlink assignment for at least one terminal device (for example, UEs 110) on a downlink control channel on a monitoring occasion of a first time pattern, transmitting data on a downlink shared channel associated to the first downlink assignment. The method may include transmitting a second downlink assignment on a downlink control channel monitoring for the at least one terminal device on at least the next symbol after transmission of the data; and transmitting a third downlink assignment for at least one terminal device (for example, different of the same UEs 110 as described with respect to transmitting the first downlink assignment) on a downlink control channel on a monitoring occasion of a second time pattern. The first time pattern has more than one downlink control channel monitoring occasion per slot and said second time pattern follows slot periodicity.

Without in any way limiting the scope, interpretation, or application of the claims appearing below, a technical effect of one or more of the example embodiments disclosed herein is that a gNB 170 may prepare DL packets in advance (without knowing the absolute starting timing of the COT). Another technical effect is to provide a scalable solution for different gNB implementations (for example, K is a higher layer parameter that may be adjusted based on different gNB implementations). The example embodiments provide UE power savings. For example, unnecessary mini-slot based PDCCH monitoring may be avoided at the UE. Reduced control channel and DMRS overhead (unnecessary mini-slot based PDCCH and DMRS overhead may be avoided by use of the example embodiments. The example embodiments described herein may support CA and multiple BW parts. Another technical effect is to provide a system which is robust against possible error cases.

An example embodiment may provide a method comprising performing, by a terminal device, downlink control channel monitoring according to a first time pattern; determining that data has been transmitted on downlink on a number of symbols; based on the determination that the data is transmitted, suspending the performing of downlink control channel monitoring according to the first time pattern; and performing downlink control channel monitoring on at least one symbol after transmission of the data.

In accordance with the example embodiments as described in the paragraphs above, performing downlink control channel monitoring according to a second time pattern at least for one next slot after the end of the transmission of the data.

In accordance with the example embodiments as described in the paragraphs above, wherein the terminal device has received configuration parameters for the downlink control channel monitoring according to the first and the second time pattern.

In accordance with the example embodiments as described in the paragraphs above, performing the downlink control channel monitoring on at least one symbol after the transmission of the data based on at least one of a set of configuration parameters of the downlink control channel monitoring according to the first time pattern.

In accordance with the example embodiments as described in the paragraphs above, wherein the data is transmitted on physical downlink shared channel.

In accordance with the example embodiments as described in the paragraphs above, wherein the determination that the data is transmitted is based on at least one of detecting a downlink assignment intended for the terminal device on the downlink control channel, and detecting downlink control information intended for a group of terminal devices.

In accordance with the example embodiments as described in the paragraphs above, determining, by the terminal device, that downlink transmission has ended and based on the determination that the downlink transmission has ended, suspending the downlink control channel monitoring according to a second time pattern.

In accordance with the example embodiments as described in the paragraphs above, determining, by the terminal device, that there is no downlink transmission from a base station; and based on the determination that there is no downlink transmission from the base station, performing the downlink control channel monitoring according to the first time pattern.

In accordance with the example embodiments as described in the paragraphs above, wherein the first time pattern has more than one downlink control channel monitoring occasion per slot and a second time pattern follows slot periodicity.

In accordance with the example embodiments as described in the paragraphs above, wherein the downlink control channel monitoring is performed on an unlicensed band.

An example embodiment may be provided in an apparatus comprising at least one processor; and at least one non-transitory memory including computer program code, the at least one memory and the computer program code may be configured to, with the at least one processor, cause the apparatus to: perform downlink control channel monitoring according to a first time pattern; determine that data is transmitted on downlink on a number of symbols; based on the determination that the data is transmitted, suspend the performing of downlink control channel monitoring according to the first time pattern; and perform downlink control channel monitoring on at least one symbol after transmission of the data.

In accordance with the example embodiments as described in the paragraphs above, perform downlink control channel monitoring according to a second time pattern at least for one next slot after the end of the transmission of the data.

In accordance with the example embodiments as described in the paragraphs above, wherein the apparatus has received configuration parameters for the downlink control channel monitoring according to the first and the second time pattern.

In accordance with the example embodiments as described in the paragraphs above, perform the downlink control channel monitoring on at least one symbol after the transmission of the data based on at least one of a set of configuration parameters of the downlink control channel monitoring according to the first time pattern.

In accordance with the example embodiments as described in the paragraphs above, wherein the data is transmitted on physical downlink shared channel.

In accordance with the example embodiments as described in the paragraphs above, wherein the determination that the data is transmitted is based on at least one of detecting a downlink assignment intended for the terminal device on the downlink control channel, and detecting downlink control information intended for a group of terminal devices.

In accordance with the example embodiments as described in the paragraphs above, determine that downlink transmission has ended; and based on the determination that the downlink transmission has ended, suspend the downlink control channel monitoring according to a second time pattern.

In accordance with another example, an example apparatus comprises: means for performing, by the apparatus, downlink control channel monitoring according to a first time pattern; means for determining that data is transmitted on downlink on a number of symbols; means for based on the determination that the data is transmitted, suspending the performing of downlink control channel monitoring according to the first time pattern; and means for performing downlink control channel monitoring on at least one symbol after transmission of the data.

In accordance with the example embodiments as described in the paragraphs above, means for performing downlink control channel monitoring according to a second time pattern at least for one next slot after the end of the transmission of the data.

In accordance with the example embodiments as described in the paragraphs above, wherein the apparatus has received configuration parameters for the downlink control channel monitoring according to the first and the second time pattern.

In accordance with the example embodiments as described in the paragraphs above, means for performing the downlink control channel monitoring on at least one symbol after the transmission of the data based on at least one of a set of configuration parameters of the downlink control channel monitoring according to the first time pattern.

In accordance with the example embodiments as described in the paragraphs above, wherein the data is transmitted on physical downlink shared channel.

In accordance with the example embodiments as described in the paragraphs above, wherein the determination that the data is transmitted is based on at least one of detecting a downlink assignment intended for the terminal device on the downlink control channel, and detecting downlink control information intended for a group of terminal devices.

In accordance with the example embodiments as described in the paragraphs above, means for determining, by the apparatus, that downlink transmission has ended, and means for In accordance with the example embodiments as described in the paragraphs above, means for suspending the downlink control channel monitoring according to a second time pattern based on the determination that the downlink transmission has ended.

In accordance with the example embodiments as described in the paragraphs above, wherein the first time pattern has more than one downlink control channel monitoring occasion per slot and a second time pattern follows slot periodicity.

In accordance with the example embodiments as described in the paragraphs above, wherein the downlink control channel monitoring is performed on an unlicensed band.

In accordance with another example, an example apparatus comprises: means for preparing a physical downlink shared channel and a corresponding physical downlink control channel beforehand, wherein the physical downlink shared channel that may be longer than a physical downlink control channel monitoring periodicity.

In accordance with another example, an example method comprises transmitting, by a base station, a first downlink assignment for at least one terminal device on a downlink control channel on a monitoring occasion of a first time pattern, transmitting data on a downlink shared channel associated to the first downlink assignment, transmitting a second downlink assignment on a downlink control channel monitoring for the at least one terminal device on at least the next symbol after transmission of the data; and transmitting a third downlink assignment for at least one terminal device on a downlink control channel on a monitoring occasion of a second time pattern, wherein the first time pattern has more than one downlink control channel monitoring occasion per slot and said second time pattern follows slot periodicity.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments, these descriptions should not be viewed in a limiting sense. Rather, there are several variations and modifications which may be made without departing from the scope of the present invention.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications which may be made without departing from the scope of the present invention as defined in the appended claims.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of example and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising:
   receiving, by a terminal device, configuration parameters for downlink control channel monitoring according to a first time pattern and a second time pattern;
   performing, by the terminal device, the downlink control channel monitoring according to the first time pattern, wherein the downlink control channel monitoring is performed on an unlicensed band;
   determining that data has been transmitted on the downlink on a number of symbols, wherein the determination that the data is transmitted is based on detecting downlink control information intended for a group of terminal devices;
   based on the determination that the data is transmitted, suspending the performing of the downlink control channel monitoring according to the first time pattern;
   performing downlink control channel monitoring according to the second time pattern on at least a next symbol after transmission of the data;
   performing downlink control channel monitoring according to the second time pattern at least for one next slot after the end of the transmission of the data, wherein the first time pattern has more than one downlink control channel monitoring occasion per slot and a second time pattern follows slot periodicity of 2 symbols or 14 symbols;
   determining, by the terminal device, that downlink transmission has ended; and
   based on the determination that the downlink transmission has ended, suspending the downlink control channel monitoring according to the second time pattern.

2. The method of claim 1, further comprising:
   performing the downlink control channel monitoring on at least the next symbol after the transmission of the data based on at least one of a set of configuration parameters of the downlink control channel monitoring associated to at least one of the first time pattern or a second time pattern.

3. The method of claim 1, wherein the data is transmitted on physical downlink shared channel.

4. The method of claim 1, further comprising:
   determining, by the terminal device, that there is no downlink transmission from a base station; and
   based on the determination that there is no downlink transmission from the base station, performing the downlink control channel monitoring according to the first time pattern.

5. An apparatus, comprising least one processor; and at least one non-transitory memory including computer program code, the at least one memory and the computer program code configured to, with the at least one processor, cause the apparatus to:
   receive configuration parameters for downlink control channel monitoring according to a first time pattern and a second time pattern;
   perform the downlink control channel monitoring according to the first time pattern, wherein the downlink control channel monitoring is performed on an unlicensed band;
   determine that data has been transmitted on downlink on a number of symbols, wherein the determination that the data is transmitted is based on detecting downlink control information intended for a group of terminal devices;
   based on the determination that the data is transmitted, suspend the performing of the downlink control channel monitoring according to the first time pattern;
   perform downlink control channel monitoring according to the second time pattern on at least a next symbol after transmission of the data;
   perform downlink control channel monitoring according to the second time pattern at least for one next slot after the end of the transmission of the data, wherein the first time pattern has more than one downlink control channel monitoring occasion per slot and a second time pattern follows slot periodicity of 2 symbols or 14 symbols;
   determine that downlink transmission has ended; and
   based on the determination that the downlink transmission has ended, suspend the downlink control channel monitoring according to the second time pattern.

6. The apparatus of claim 5, wherein the at least one memory and the computer program code further configured to, with the at least one processor, cause the apparatus to:
   perform the downlink control channel monitoring on at least the next symbol after the transmission of the data based on at least one of a set of configuration parameters of the downlink control channel monitoring associated to at least one of the first time pattern and a second time pattern.

7. The apparatus of claim 5, wherein the data is transmitted on physical downlink shared channel.

\* \* \* \* \*